DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 30, 1971

892 O.G. 1606

T892,026

PROCESS FOR IMPROVING RELEASE PROPERTIES AND LUBRICITY OF PERFLUOROOLEFIN POLYMER FILMS

Michael J. Bagnall, Grand Blanc, Mich., and Michael W. Miller, King of Prussia, and Le Verne K. Osdal and Edward J. Welch, Springfield, Pa., assignors to E. I. du Pont de Nemours and Company, Wilmington, Del.

Filed Oct. 16, 1970, Ser. No. 81,627

Int. Cl. B44d *1/38, 1/46, 1/48*

U.S. Cl. 117—64

No Drawing. 15 Pages Specification

Process for improving the lubricity and release properties of the surface of films of polytetrafluoroethylene, tetrafluoroethylene/hexafluoropropylene copolymers, or blends of polytetrafluoroethylene or tetrafluoroethylene/hexafluoropropylene with other film-forming material which comprises subjecting the surfaces of such films to sufficient thermal energy or mechanical energy to coalesce at least some of the polytetrafluoroethylene or tetrafluoroethylene/hexafluoropropylene at the surface of the film.